(12) United States Patent
Chiu et al.

(10) Patent No.: US 7,127,317 B2
(45) Date of Patent: Oct. 24, 2006

(54) SYSTEM AND METHOD TO ANALYZE LOW YIELD OF WAFERS CAUSED BY ABNORMAL LOT EVENTS

(75) Inventors: Wen Jen Chiu, Hsinchu (TW); Wei-Chin Shiau, Hsin-Chu (TW); Chen Hsin Hsiung, Taipei (TW); Kuan Liang Wu, Taipei (TW); Yu-Jye Lan, Taipei (TW); Shiaw-Lin Chi, Hsinchu (TW); Chia Hui Hsu, Hsin-Chu (TW); Ming Tsang Yu, Taipei (JP)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 10/999,850

(22) Filed: Nov. 30, 2004

(65) Prior Publication Data
US 2006/0116784 A1 Jun. 1, 2006

(51) Int. Cl.
G06F 19/00 (2006.01)
(52) U.S. Cl. .................. 700/110; 700/108; 702/183
(58) Field of Classification Search ........ 700/108–110, 700/121; 702/183–184
See application file for complete search history.

(56) References Cited

U.S. PATENT DOCUMENTS

| | | | |
|---|---|---|---|
| 6,324,481 B1* | 11/2001 | Atchison et al. | 702/84 |
| 6,684,124 B1* | 1/2004 | Schedel et al. | 700/121 |
| 2002/0183879 A1* | 12/2002 | Schedel et al. | 700/108 |
| 2003/0158795 A1* | 8/2003 | Markham et al. | 705/28 |
| 2004/0029029 A1* | 2/2004 | Atkinson et al. | 430/30 |

* cited by examiner

Primary Examiner—Zoila Cabrera
(74) Attorney, Agent, or Firm—Tung & Associates (57) ABSTRACT

The present invention provides an Intelligent Engineering Data Analysis (I-EDA) system and method to help prevent low wafer yield and prevent occurrences of abnormal events. The I-EDA has a non-conforming wafer tracing (NCWT) system that operates to correlate occurrences of abnormal events with low wafer yield. The method generally has the steps of performing a fabrication operation on wafers disposed within a wafer lot; determining if an abnormal event occurred while performing the fabrication operation on the wafers disposed within the wafer lot; using a NCWT to determine a statistical correlation between an occurrence of an abnormal event and a wafer yield of the wafers being processed during the occurrence of the abnormal event if the abnormal event occurred during processing of the wafers disposed within the wafer lot; and using the determined statistical correlation to analyze the fabrication process and thereby improve wafer yield.

13 Claims, 6 Drawing Sheets

*Figure 1*

| | ABNORMAL EVENT TYPE | POSEIDON | PROMIS | SiView |
|---|---|---|---|---|
| 48 | OOC/OOS | | | |
| 52 | Qtime over | | | |
| 54 | Particle Defect | | | |
| 56 | Wafer Broken | | | |
| 58 | ADI/AEI | | | |
| 60 | Machine Alarm | | | |
| 64 | Qty Mismatch | | | |
| 66 | PHOTO REWORK | | | |
| 68 | CMP REWORK | | | |

| ITEM | DESCRIPTION |
|---|---|
| Event Code | Impacted event |
| PES (Qty) | Impacted wafer Qty |
| ID=(wafer_ID) | Impacted wafer_ID |
| CC=(Cause code) | what's the root cause event |
| CT=(Cause tool) | what is the root cause tool |
| CS=(Cause stage) | what is the root cause stage |
| AC=(Action code) | what you beat those wafers |
| SD=(Slot ID) | impacted wafer ID |

Figure 4

$$ETEP, 5PCS, ID = 1-5,9,10; CT = CDFNF2
CS = PO1\_DP, CC = DITH, AC = ETRE

SYSTEM AND METHOD TO ANALYZE LOW YIELD OF WAFERS CAUSED BY ABNORMAL LOT EVENTS

FIELD OF THE INVENTION

The present invention relates to an Intelligent Engineering Data Analysis (I-EDA) system and method to help prevent low wafer yield and prevent occurrences of abnormal events.

BACKGROUND

In an automated manufacturing environment that performs batch processing, determining a cause of a low yield of specific items within the batch can prove difficult.

Two systems that use SPC to sample and quality test manufactured products are disclosed in U.S. Pat. No. 6,141,647 issued to Meijer et al. ('647 patent), and U.S. Pat. No. 6,345,259 B1 issued to Sandoval ('259 patent). The systems disclosed in the '647 and the '259 patent provide a manufacturing execution system that operates to determine the quality of batch processed manufactured items and then adjusts the quantity of future batch output based on the quality results determined using SPC processing. The systems disclosed in the '647 and the '259 patent use the SPC data as acceptance sampling for a batch and feed that information back to an ordering system. However, the '647 and the '259 operates at a batch level and is not able to diagnose a problem in the batch processing that is correlated with a low item yield.

In a semiconductor fabrication facility that processes wafers in batches of wafers called lots, finding a correlation between an abnormal event and resulting individual wafer yield of wafers disposed within a lot can be difficult. Additionally, finding a root cause of low wafer yield using lot-based data is difficult. Efforts are continually used to improve wafer yield, however, existing systems and methods do not provide a good way to monitor or determine whether wafer yield is actually improved based on properly diagnosing abnormal lots.

Typically abnormal events occurring in a wafer manufacturing process are diagnosed at the lot level, not at the wafer level. However, existing systems do not provide a system or method to correlate the occurrence of an abnormal event with individual wafers disposed within a lot even though, typically, when an abnormal event occurs, only a portion of a lot, rather than an entire lot is affected. Thus, it is desirable to provide a system that can correlate abnormal event occurrences with individual wafers impacted by the abnormal occurrence and analyze the results of the correlation to improve wafer yield.

SUMMARY OF THE INVENTION

The main object of the present invention is to determine whether a low wafer yield is related to a nonconforming or an abnormal event and then to adjust the process having an abnormal event occurrence to improve wafer yield.

In general, the present invention provides an Intelligent Engineering Data Analysis (I-EDA) system and analysis method to help prevent low wafer yield and prevent occurrences of abnormal events.

More particularly, the I-EDA system of the present invention provides:

at least one manufacturing execution system having an operation management interface in communication with at least one piece of fabrication equipment disposed within a wafer fabrication facility for collecting both abnormal event data and non-conforming wafer based data, the manufacturing execution system having:
an abnormal event database for storing collected abnormal event data,
a non-conforming wafer based data database for storing collected non-conforming wafer based data, wherein the abnormal event database and the non-conforming wafer based data database are in operative communication with each other and are in further operative communication with the operation management interface; and a nonconforming wafer tracing system in operative communication with the at least one manufacturing execution system for communication of both abnormal event type data and non-conforming wafer based event data between the nonconforming wafer tracing system and the at least one manufacturing execution system.

In accordance with one embodiment of the present invention, the present invention provides a method of using an intelligent engineering data analysis having a non-conforming wafer tracing system to improve a fabrication process having the steps of:

defining a plurality of non-conforming event types to be recorded into a nonconforming wafer tracing system, wherein the nonconforming wafer tracing system has a nonconforming wafer event graphical user interface for inputting a plurality of nonconforming wafer test data;

using a standard format to collect abnormal event data and non-conforming wafer based data disposed within a manufacturing execution system;

extracting the collected abnormal event data and the non-conforming wafer based data from an manufacturing execution system into the nonconforming wafer tracing system;

transforming the extracted abnormal event data and non-conforming wafer based data into a plurality of nonconforming wafer test data, wherein the plurality of nonconforming wafer test data is disposed within the nonconforming wafer tracing system;

correlating the plurality of nonconforming wafer test data with results of a wafer acceptance test;

using the nonconforming wafer test graphical user interface to input a plurality of nonconforming wafer test data associated with each lot processed during an occurrence of an abnormal event;

using the nonconforming wafer test graphical user interface to generate a daily lot report, wherein the daily lot report identifies each lot associated with an abnormal event as a potential lot that may have a low wafer yield;

sending the daily lot report to recipients who are pre-defined to receive the daily lot report from the nonconforming wafer test graphical user interface; and providing a flexible analysis function within the nonconforming wafer test graphical user interface to generate at least one engineering data analysis report for analyzing abnormal events that impacted low wafer yield.

In accordance with another preferred embodiment of the present invention, the present invention provides a method of improving wafer yield of wafers processed within a wafer fabrication facility having the steps of:

performing a fabrication operation on a plurality of wafers disposed within at least one wafer lot;

determining if an abnormal event occurred while performing the fabrication operation on the plurality of wafers disposed within the at least one wafer lot;

using a nonconforming wafer tracing system to determine a statistical correlation between an occurrence of an abnormal event and a wafer yield of the plurality of wafers being processed during the occurrence of the abnormal event if the abnormal event occurred during processing of the plurality of wafers disposed within the at least one wafer lot; and using the determined statistical correlation to analyze the fabrication process and thereby improve wafer yield.

In accordance with another preferred embodiment of the present invention, the present invention provides a method of improving wafer yield of wafers processed within a wafer fabrication facility having the steps of:

performing a fabrication operation on a plurality of wafers disposed within at least one wafer lot;

determining if an abnormal event occurred while performing the fabrication operation on the plurality of wafers disposed within the at least one wafer lot;

determining whether a hold was placed on a lot being processed if an abnormal event occurred; placing a hold on a lot being processed if an abnormal event occurred during processing of the lot;

using a nonconforming wafer tracing system to determine a statistical correlation between an occurrence of an abnormal event and a wafer yield of the plurality of wafers being processed during the occurrence of the abnormal event if the abnormal event occurred during processing of the plurality of wafers disposed within the at least one wafer lot; and using the determined statistical correlation to analyze the fabrication process and thereby improve wafer yield.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENTS

The present invention provides a system and method to determine whether a low wafer yield is related to a nonconforming or an abnormal event.

The present invention operates to: reduce low yield of wafers; improve the quality of wafer processing by helping to identify improper recover or rework procedures that operate to reduce wafer yield; collect wafer based information of wafers disposed within a lot being processed during occurrence of an associated abnormal event; and analyze the relation between abnormal or non-conforming events and low wafer yield.

The present invention provides a manufacturing execution system (MES) data collection mechanism to collect non-conforming events occurring within wafer fabrication process and to collect wafer based information and an I-EDA system to analyze the data collected by the MES data collection mechanism.

The present invention helps integration process engineers responsible for individual wafer lots to trace low yield wafers and to trace non-conforming events occurring when the wafer yield is low.

Additionally, the present invention helps process engineers working within each area of a manufacturing facility, preferably a semiconductor wafer fabrication facility (FAB) to summarize daily occurring non-conforming events occurring with each area of the FAB and to summarize wafer yield information associated with impacted wafers that have been tested using a circuit probe (CP).

An impacted wafer lot is a lot of wafers associated with a non-conforming event having a high hit rate in accordance with a T-test. If the non-conforming event is associated with a high hit rate, then a process engineer should take enhancement actions to improve wafer based low yield or to reduce the non-conforming event associated with the high hit rate. Enhancement actions may include a scrap or a rework procedure.

Preferably, a statistical t-test is used to determine if an abnormal event occurring within the FAB process, preferably identified using statistical process control (SPC), correlates with a variation within the lot being processed during occurrence of an abnormal event (wafer variation) or with the entire lot to a statistically large sample size of lots processed within a time period P, preferably the statistically large sample size of lots is selected from at least one of the at least last 50 lots and the at least last month of processed lot-related data. The results of the t-test are used to improve the process associated with the occurrence of the abnormal event.

More specifically, the T-test determines whether an abnormal event occurring within a FAB caused a mean shift to a portion of a lot or at least one wafer being processed during occurrence of an abnormal event or a mean shift of the whole lot with reference to a stable process mean.

Figure 1:
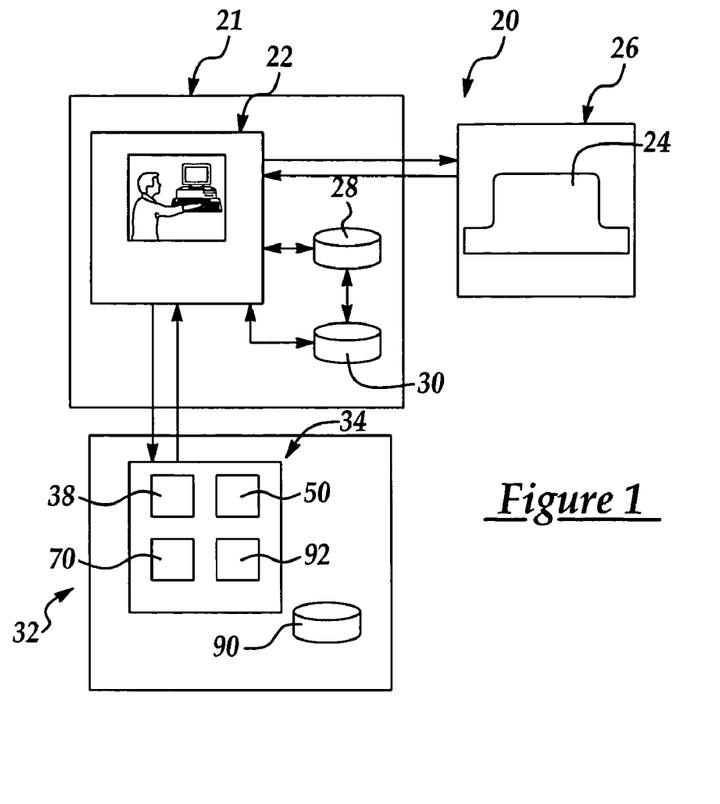
FIG. 1 is an overview of a an Intelligent Engineering Data Analysis (I-EDA) system that help prevent low wafer yield and prevent occurrences of abnormal events. multi-platform computer network in accordance with the present invention.

Referring now to the drawings, as shown in FIG. 1, the present invention provides an Intelligent Engineering Data Analysis (I-EDA) system 20 to help prevent low wafer yield and prevent occurrences of abnormal events. The I-EDA system 20 having:

a) at least one MES system 21 having an operation management interface (OMI) 22 in communication with at least one of a piece of fabrication equipment 24, preferably, a plurality of pieces of fabrication equipment disposed within a wafer fabrication facility 26 for collecting both abnormal event data and non-conforming wafer based data, the MES having b) an abnormal event database 28 for storing collected abnormal event data, c) a non-conforming wafer based data database 30 for storing collected non-conforming wafer based data, wherein the abnormal event database 28 and the non-conforming wafer based data database 30 are in operative communication with each other and are in further operative communication with the operation management interface; and d) a NCWT system 32 in operative communication with the at least one MES, and in particular, in operative communication with the OMI 22 for communication of both abnormal event type data and non-conforming wafer based event data between the NCWT system and the at least one MES system.

Preferably, the NCWT system has a NCWT GUI 34 in operative communication with the MES operation management interface 22 for extracting and transforming the collected abnormal event data and the collected non-conforming wafer based data from the at least one MES system 21 for use within the NCWT system 32.

Preferably, the operation management interface (OMI) 22 operates to provide a standard format for communicating abnormal event type data and non-conforming wafer based event data to the NCWT GUI 34.

Preferably, the NCWT GUI 34 has an abnormal event type screen 38, a NWCT GUI data codes screen 70, a standard lot note screen 92, and a NCWT data entry screen 50. However, additional screens may be added to further define correlation between abnormal events and wafer yield in accordance with the present invention.

Figure 2:
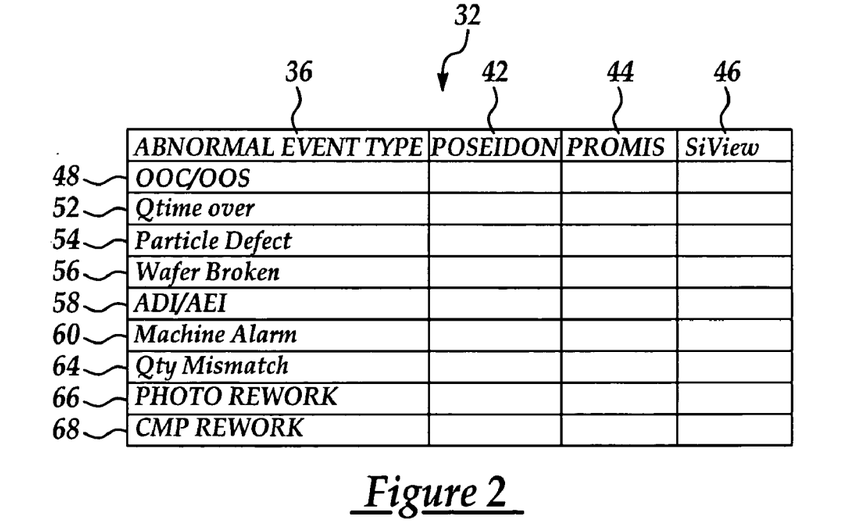
FIG. 2 is an enlarged view of an abnormal event type screen of a nonconforming wafer test graphical user interface (NCWT GUI).

In accordance with a preferred embodiment, FIG. 2 shows an enlarged view of the abnormal event type screen 38 of the NCWT GUI 34. The abnormal event type screen 38 provides a plurality of fields for defining each of a plurality of abnormal events types 36. Each of the plurality of abnormal event types 36 define a plurality of abnormal events that can occur in the wafer fabrication process, wherein the plurality of abnormal event types may be communicated from the operation management interface 22 to the NCWT GUI 34.

Additionally, each of the identified abnormal event types 36 are further associated with abnormal events occurring within the at least one MES system 21, wherein the at least one MES system 21 is preferably selected from, but not limited to, at least one of a Poseidon system, a PROMIS system, a SiView system, and wherein the identification of each system is shown in fields 42, 44, and 46 respectively. Preferably, the at least one MES system 21 may be any manufacturing execution system in communication with a plurality of automated equipment within a manufacturing or fabrication facility.

As shown in FIG. 2, the abnormal events are preferably defined within a plurality of fields disposed within the abnormal event type screen 38, wherein the abnormal events are selected from but are not limited to the following: an out of control (OOC) process event or an out of specification (OOS) event, a process running past a quench time (Qtime) event (Qtime over event), a particle defect event, a wafer broken event, an abnormal after development inspection (ADI) or after etch inspection (AEI), a machine alarm event; a mismatched quantity (Q'ty mismatch) event, a photo rework event, and a chemical mechanical polishing (CMP) rework event;

Field 48 defines an OOC process event or OOS event, such as a lot that is out of specification, wherein the OOC process event and the OOS event may be detected by an SPC server in communication with a MES system such as POSEIDON.

Field 52 defines Qtime over event, wherein the Qtime is a pre-defined waiting time in-between processes. Preferably, the Qtime over event may be detected by a MES system such as POSEIDON;

Field 54 defines a particle defect event, wherein the particle defect event is preferably detected by a process such as a KLA scan, however any other particle defect detection device capable of detecting defects at a micron level such as particle defects on a semiconductor wafer or piece of wafer fabrication equipment may be used.

Field 56 defines a broken wafer event, wherein a broken wafer event is typically detected by a technical employee (TE) working within the wafer fabrication facility.

Field 58 defines an abnormal ADI/AEI event such as an occurrence of a wafer wherein the wafer defect may be detected by during an ADI or an AEI.

Field 60 defines a machine alarm event, wherein the machine alarm event is preferably selected from an abnormal tool event, and a FAC event. The abnormal tool event detecting that a tool, such as a KLA particle defect detection tool, is out of specification. An FAC event is an event associated with facilities-related downtime.

Field 64 defines a Q'ty mismatch event, wherein the mismatched quantity event may be a lot having a mismatched quantity of wafers.

Field 66 defines a photo rework event.

Field 68 defines a CMP rework event 68.

The list of abnormal events is not limited to the above-enumerated abnormal events but may be defined at a later time and may be manually entered into the NWCT system 32 using the associated NWCT system GUI 34.

Figure 3:
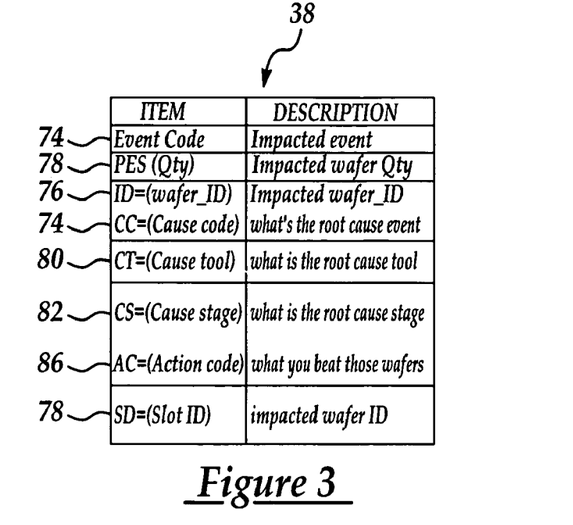
FIG. 3 is an illustration of a NWCT GUI data codes screen.

As shown in FIG. 3, the NWCT GUI data codes screen 70 is provided to display a plurality of NCWT data codes within a plurality of item fields. The plurality of NCWT data codes preferably includes, but is not limited to an abnormal event code (EC), shown in field 74, an impacted wafer ID (ID), shown in field 76, an impacted wafer quantity (PCS), shown in field 78, a cause tool ID (CT), shown in field 80, a cause stage (CS) shown in field 82, a cause code (CC), shown in field 84, and an action code (AC), shown in field 86. Preferably each impacted wafer having a wafer ID is evaluated in accordance with a wafer acceptance test (WAT). Preferably, a WAT is performed by using a circuit probe (CP) to determine if wafers disposed within a lot that was processed when an abnormal event occurred have a defect.

The EC, shown in field 74, defines an abnormal event's occurrence location within a processing operation and an abnormal event type (see above for an enumerated list). Alternatively, the EC, shown in field 74, may be defined as a cause code (CC) (as shown in field 84) defining a root cause event triggering the abnormal event. The wafer impacted ID, shown in field 76, defines a wafer ID disposed within a held lot impacted by the abnormal event. Alternatively, the impacted wafer ID, shown in field 76, may be identified as a slot ID. The PCS, as shown in field 78, defines a quantity of wafers impacted by an abnormal event. The CT, as shown in field 80, defines a tool ID impacted by occurrence of the abnormal event. The CS, shown in field 82, defines an abnormal event impacted stage id. The action code defines an action to be taken in accordance with occurrence of the EC, shown in field 74.

Figure 4:
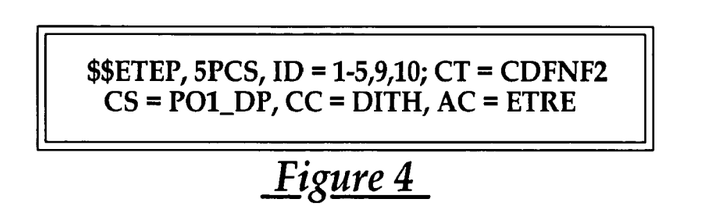
FIG. 4 is an illustration of a plurality of values associated with a plurality of NCWT data codes in accordance with the present invention.

In accordance with a preferred embodiment of the present invention, sample data retrieved from a NCWT system as shown in FIG. 4, shows a plurality of values associated with a plurality of NCWT data codes, wherein the values are defined as follows: EC=ETEP, wafer PCS=7PCS, wafer ID=1–5,9, 10; CT=CDFNF2; CS=PO1_DP; CC=DITH; and the AC=ETRE.

The EC identifies that an abnormal event type, an endpoint failure (EP) occurred in an ETCH area (ET).

The wafer PCS=7PCS, identifies that 7 wafer pieces were impacted by the abnormal event.

The wafer ID=1–5,9, and 10 identifies wafers having wafer ID's 1–5,9, and 10 were the wafers impacted by the abnormal event.

The Cause Tool ID=CDFNF2 is the tool ID for the tool or piece of fabrication equipment performing a fabrication operation on the impacted lot.

The cause stage is PO1_DP, is the stage of processing that the lot was undergoing upon occurrence of the abnormal event.

The cause code for defining the abnormal event's root cause is DITH, wherein DITH indicates a thickness drift in a DIF area. The action code AC=ETRE indicates that the action to be taken upon occurrence of the abnormal event for the etch area (ET) is to perform a re-etch (RE) on the impacted wafers.

Preferably, when an abnormal event occurs during processing of a plurality of wafers disposed within a lot, a hold is placed on the lot using an associated hold code.

After a hold is placed on a lot due to an abnormal event, lot data associated with the held lot may be manually or automatically input into the NWCT GUI 34 as NCWT data, wherein the NCWT data is the extracted and transformed abnormal event data and the non-conforming wafer based data from the MES.

Figure 5:
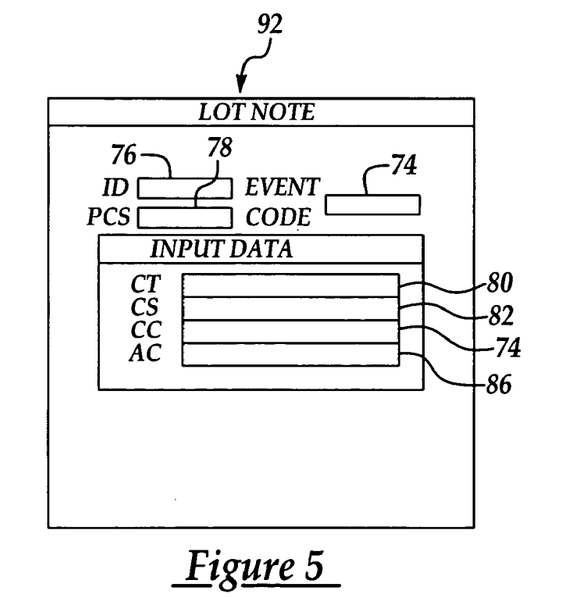
FIG. 5 is an illustration of a NCWT GUI standard lot note screen.

As shown in FIG. 5, the NCWT GUI standard lot note screen 92 is provided for manipulating the NCWT data. Additionally, the NCWT data may be stored within the NCWT data database 90 by either automatically or manually entering the NCWT data into a NCWT GUI standard lot note screen 92. The NCWT GUI standard lot note screen 92 preferably provides an off-line data key-in interface for manually inputting the NCWT data into the NCWT data database. The standard lot format defines all NCWT data associated with a lot being held because the lot was being processed during occurrence of an abnormal event.

Additionally, the NCWT data entry screen 50 of the NCWT GUI is provided to further enter the NCWT data into the NCWT system. Preferably the NCWT data entry screen provides a centralized code table for entering event codes, cause codes, and action codes to snapshot to the at least one MES system 21; and to provide a function to control a user's account privilege, define a potential hold rule, a summary report configuration, and a link to the off-line data key-in interface for defining abnormal events not collected by the MES.

Analysis of wafer yield may then be performed by statistically correlating results of a wafer acceptance yield test with occurrence of the abnormal event to determine if the wafer yield of the held lot processed during the abnormal event was impacted using the NCWT data.

Preferably, the statistical correlation of results of a wafer acceptance yield test with occurrence of the abnormal event to analyze wafer yield is performed a statistical t-test, wherein the t-test is used to determine if an abnormal event occurring within the FAB process correlates wafer yield of a lot being processed during occurrence of the abnormal event with a variation within the lot being processed during occurrence of the abnormal event (wafer variation) or with the entire lot to a statistically large sample size of lots processed within a time period P, preferably the statistically large sample size of lots is selected from at least one of the at least last 50 lots and the at least last month of processed lot-related data.

Preferably an analysis report is generated after the statistical correlation is performed to prevent and to improve rework or scrap and thereby provide good fab yield control.

Preferably, the analysis report may be selected from at least one of an event count report, a hit rate report, an event count vs. a tool events report, and a hit rate vs. a tool events report.

The event count report summarized an event count during a process. The event count report is used to reduce abnormal events and to determine which abnormal events cause a lot wafer yield.

The hit rate report summarizes a relationship between an abnormal event and wafer yield by using a statistical method, preferably a T-test, wherein the T-test operates to prioritize abnormal events that impacted wafer yield.

The event count vs. tool events report summarizes an event count and the event count's distribution on a process tool. The event count vs. tool events report operates to reduce a tool's abnormal event occurrences and to determine which abnormal event occurring using the process tool causes low wafer yield.

The hit rate vs. tool events report summarizes a relationship between a tool's abnormal event occurrence and wafer yield by using a statistical method, preferably, a T-test, wherein the hit rate vs. tool events report operates to prioritize a tool's abnormal event occurrences which impacted wafer yield.

The present I-EDA system 20 operates to:

reduce abnormal events by placing lots associated with an abnormal event occurrence on hold;

improve wafer yield;

improve a rework procedure;

collect statistics data from both rework and recovery procedures related to event codes, and to review the rationality of the recovery procedures;

evaluate rework and recovery procedures effectiveness in preventing further lost costs;

collect statistics data from a Quench time (Q-time) related event code to minimize a Q-time issue and to improve Q-time control/definition, prioritize abnormal events which cause low yield to take preventative action.

Figure 6:
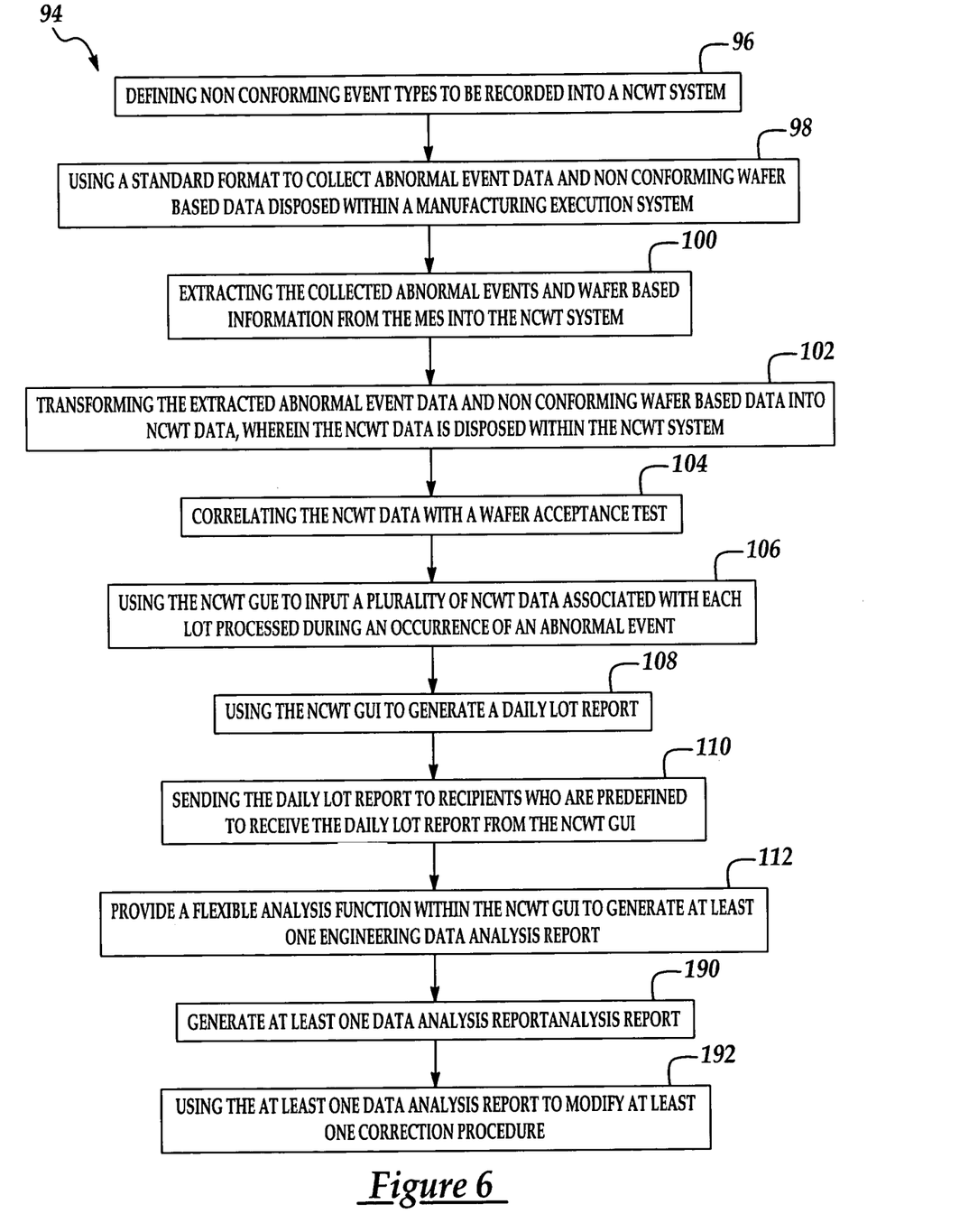
FIG. 6 is a flowchart illustrating a method of using an I-EDA system having a non-conforming wafer tracing system in accordance with a preferred embodiment of the present invention.

In accordance with a preferred embodiment of the present invention, as shown in FIG. 6, a method 94 of using an I-EDA system having a non-conforming wafer test (NCWT) system is provided herewithin. The method 94 provides following steps:

a) defining a plurality of non-conforming event types to be recorded into a NCWT system, wherein the NCWT system has a NCWT GUI for inputting a plurality of NCWT data (step 96);

b) using a standard format to collect abnormal event data and non-conforming wafer based data disposed within a manufacturing execution system (MES) (step 98);

c) extracting the collected abnormal events and wafer based information from the MES into the NCWT system (step 100);

d) transforming the extracted abnormal event data and non-conforming wafer based data into a plurality of NCWT data, wherein the plurality of NCWT data is disposed within the NCWT system (step 102);

e) correlating the plurality of NCWT data with results of a wafer acceptance test (WAT) (step 104);

f) using the NCWT GUI to input a plurality of NCWT data associated with each lot processed during an occurrence of an abnormal event (step 106);

g) using the NCWT GUI to generate a daily lot report, wherein the daily lot report identifies each lot associated with an abnormal event as a potential lot that may have a low wafer yield (step 108);

h) sending the daily lot report to recipients who are pre-defined to receive the daily lot report from the NCWT GUI (step 110); and i) providing a flexible analysis function within the NCWT GUI to generate at least one engineering data analysis report for analyzing abnormal events that impacted low wafer yield (step 112);

j) generating at least one data analysis report, wherein the at least one engineering data analysis report is selected from at least one of an event count report, a hit rate report, an event count versus a tool events report, and a hit rate versus a tool events report (step 190); and k) using the at least one data analysis report to modify at least one correction procedure selected from at least one of a recovery and a rework procedure (step 192).

Figure 7:
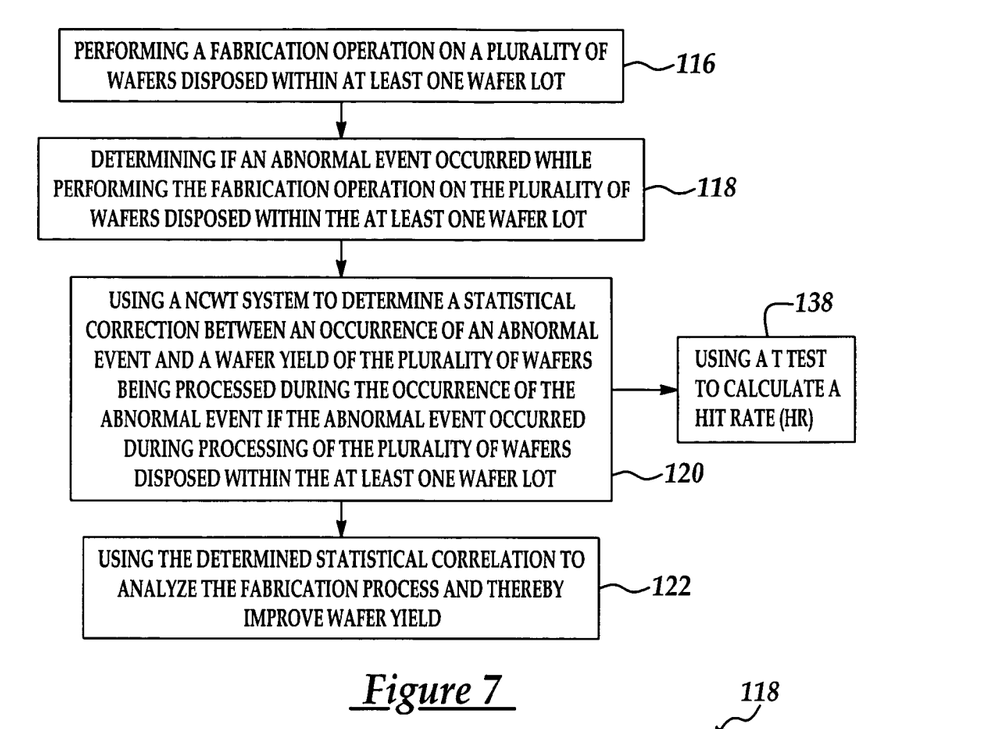
FIG. 7, is a flowchart illustrating a method of improving wafer yield of wafers processed within a wafer fabrication facility in accordance with a preferred embodiment of the present invention.

In accordance with another preferred embodiment of the present invention, a method 114 of improving wafer yield of wafers processed within a wafer fabrication facility is shown in FIG. 7. The method 114 provides the steps of:

performing a fabrication operation on a plurality of wafers disposed within at least one wafer lot (step 116);

determining if an abnormal event occurred while performing the fabrication operation on the plurality of wafers disposed within the at least one wafer lot (step 118);

using a NCWT system to determine a statistical correlation between an occurrence of an abnormal event and a wafer yield of the plurality of wafers being processed during the occurrence of the abnormal event if the abnormal event occurred during processing of the plurality of wafers disposed within the at least one wafer lot (step 120); and using the determined statistical correlation to analyze the fabrication process and thereby improve wafer yield (step 122).

Preferably, the wafer fabrication facility is a semiconductor fabrication facility capable of processing large volumes of wafers using an automated system.

Figure 8:
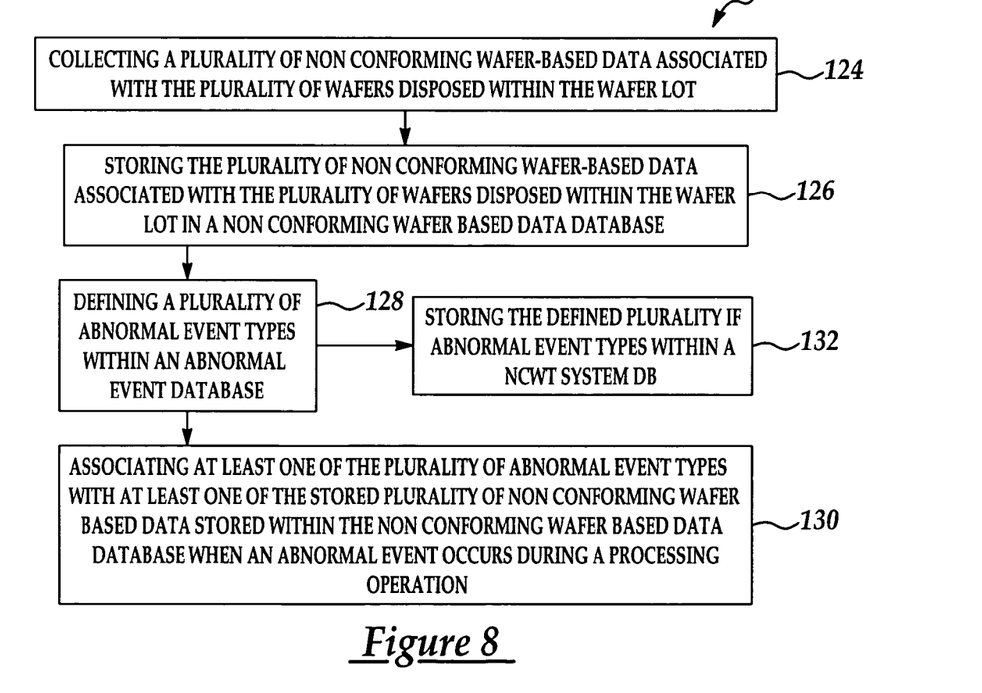
FIG. 8 is a flow chart illustrating a method of determining if an abnormal event occurred while performing a fabrication operation on a plurality of wafers disposed within at least one wafer lot in accordance with a preferred embodiment of the present invention.

In accordance with a preferred embodiment, as shown in FIG. 8, the step of determining if an abnormal event occurred while performing the fabrication operation on the plurality of wafers disposed within the at least one wafer lot (step 118) may further have the steps of:

collecting a plurality of non-conforming wafer-based data associated with the plurality of wafers disposed within the wafer lot (step 124);

storing the plurality of non conforming wafer-based data associated with the plurality of wafers disposed within the wafer lot in a non-conforming wafer based data database (step 126); and defining a plurality of abnormal event types within an abnormal event database (step 128); and associating at least one of the plurality of abnormal event types with at least one of the stored plurality of non-conforming wafer-based data stored within the non-conforming wafer based data database when an abnormal event occurs during a processing operation (step 130).

Each abnormal event type may be manually entered into the NWCT system using an associated NWCT system GUI.

Additionally, associated non-conforming wafer-based data may be stored within the NCWT system database by either automatically or manually entering the data into a standard lot format screen disposed within the NCWT GUI.

The step of defining a plurality of abnormal event types within an abnormal event database (step 128) may further have the steps of storing the defined plurality of abnormal event types within a NCWT system DB (step 132).

The step of using a NCWT system to determine a statistical correlation between an occurrence of an abnormal event and a wafer yield of the plurality of wafers being processed during the occurrence of the abnormal event if the abnormal event occurred during processing of the plurality of wafers disposed within the at least one wafer lot (step 120) may further have the step of:

using a statistical test method to test non-conforming event and calculate a hit rate (HR), wherein the HR ranges between 0 and 1 such that 0 HR 1 to indicate a probability that the abnormal event impacted wafer yield of the plurality of wafers disposed within the at least one wafer lot, wherein if the HR equals zero, then the probability that the abnormal event impacted wafer yield is low, and wherein if the HR equals 1, then the probability that the abnormal event impacted wafer yield is high (step 138).

Figure 9:
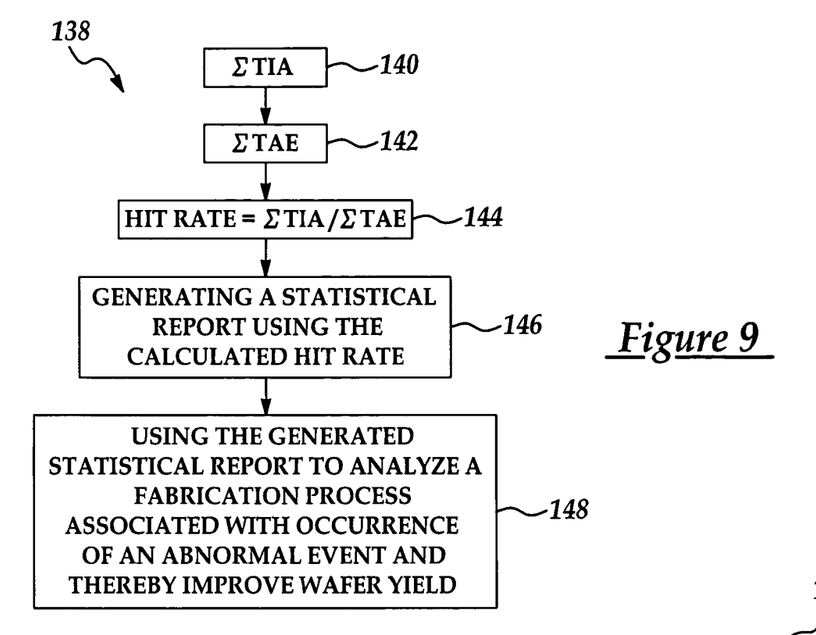
FIG. 9 is a flowchart illustrating a method of using a statistical test method to calculate a hit rate in accordance with a preferred embodiment of the present invention.

In accordance with a preferred embodiment, as shown in FIG. 9, the step 138 further having the steps of:

summing a total number of occurrences that an abnormal event set an impact alarm ($\Sigma TIA$) within a pre-defined time period P (step 140);

summing a total number of occurrences of an abnormal event ($\Sigma TAE$) within P (step 142); and determining the hit factor by dividing $\Sigma TIA$ by $\Sigma TAE$ (step 144), wherein the hit factor=$\Sigma TIA/\Sigma TAE$.

Preferably, the step 138 further has the step of:

generating a statistical report using the calculated hit rate, wherein the report is selected from at least one of an event count report, a hit rate report, an event count vs. a tool events report, and a hit rate vs. a tool events report (step 146).

Also, preferably, the step 146, further has the step of using the generated statistical report to analyze a fabrication process associated with occurrence of an abnormal event and thereby improve wafer yield (step 148).

Figure 10:
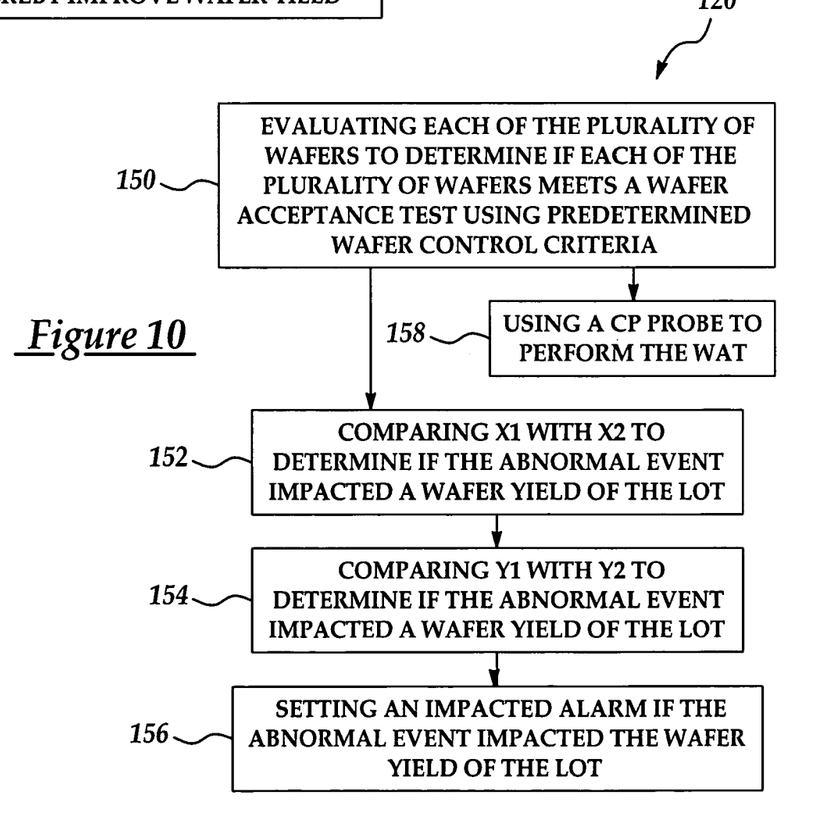
FIG. 10 is a flowchart illustrating a method of using a NCWT system to determine a statistical correlation between an occurrence of an abnormal event and a wafer yield of the plurality of wafers being processed during the occurrence of the abnormal event if the abnormal event occurred during processing of the plurality of wafers disposed within the at least one wafer lot in accordance with a preferred embodiment of the present invention.

In accordance with a preferred embodiment, as shown in FIG. 10, the step 120 may further have the steps of:

evaluating each of the plurality of wafers to determine if each of the plurality of wafers meets a wafer acceptance test using pre-defined wafer control criteria (step 150);

comparing a first mean X1 of each of the plurality of wafers not meeting the wafer acceptance test with a second mean X2 of each of the plurality of wafers meeting the wafer acceptance test to determine if the abnormal event impacted a wafer yield of the lot (step 152);

comparing a third mean Y1 of the total lot of the plurality of wafers evaluated in accordance with the WAT pre-defined criteria with a fourth mean Y2 of a total number of wafers processed within a predefined time period prior to the occurrence of the abnormal event evaluated in accordance the pre-defined wafer control criteria to determine if the abnormal event impacted a wafer yield of the lot (step 154); and setting an impact alarm if the abnormal event impacted the wafer yield of the lot (step 156).

The step of evaluating each of the plurality of wafers to determine if each of the plurality of wafers meets a wafer acceptance test using pre-defined wafer control criteria (step 150) preferably, includes the additional step of using a CP probe to perform the WAT (step 158).

Figure 11:
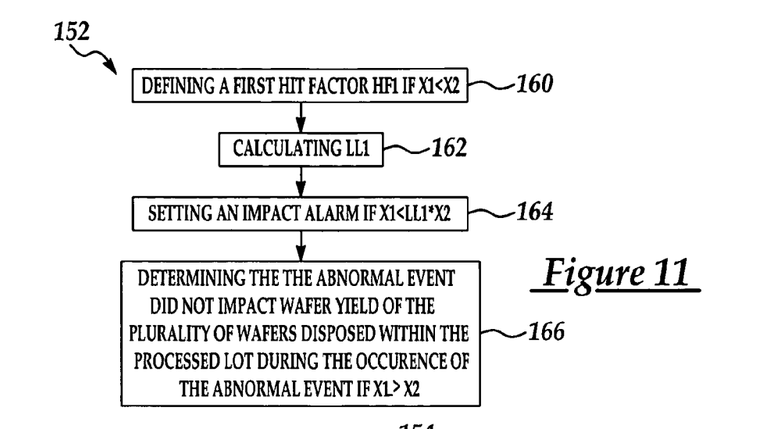
FIG. 11 is a flowchart illustrating a method of comparing a first mean X1 with a second mean X2 to determine if an abnormal event impacted a wafer yield of the lot in accordance with a preferred embodiment of the present invention.

In accordance with a preferred embodiment, as shown in FIG. 11, the step of comparing X1 with X2 to determine if the abnormal event impacted a wafer yield of the lot (step 152) may further have the steps of:

defining a first hit factor HF1 if $X1<X2$ (step 160);

calculating a first predefined tolerance level limit LL1 used to identify a statistical difference between the wafers not passing the WAT and the wafers passing the WAT (step 162), wherein $LL1=HF1*X2$;

setting an impact alarm if $X1<LL1*X2$ (step 164), wherein if an impact alarm is set, then the abnormal event impacted the wafer yield of the plurality of wafers disposed within the processed lot during the occurrence of the abnormal event;

determining that the abnormal event did not impact wafer yield of the plurality of wafers disposed within the processed lot during the occurrence of the abnormal event if X1 X2 (step 166).

Figures 12, 13:
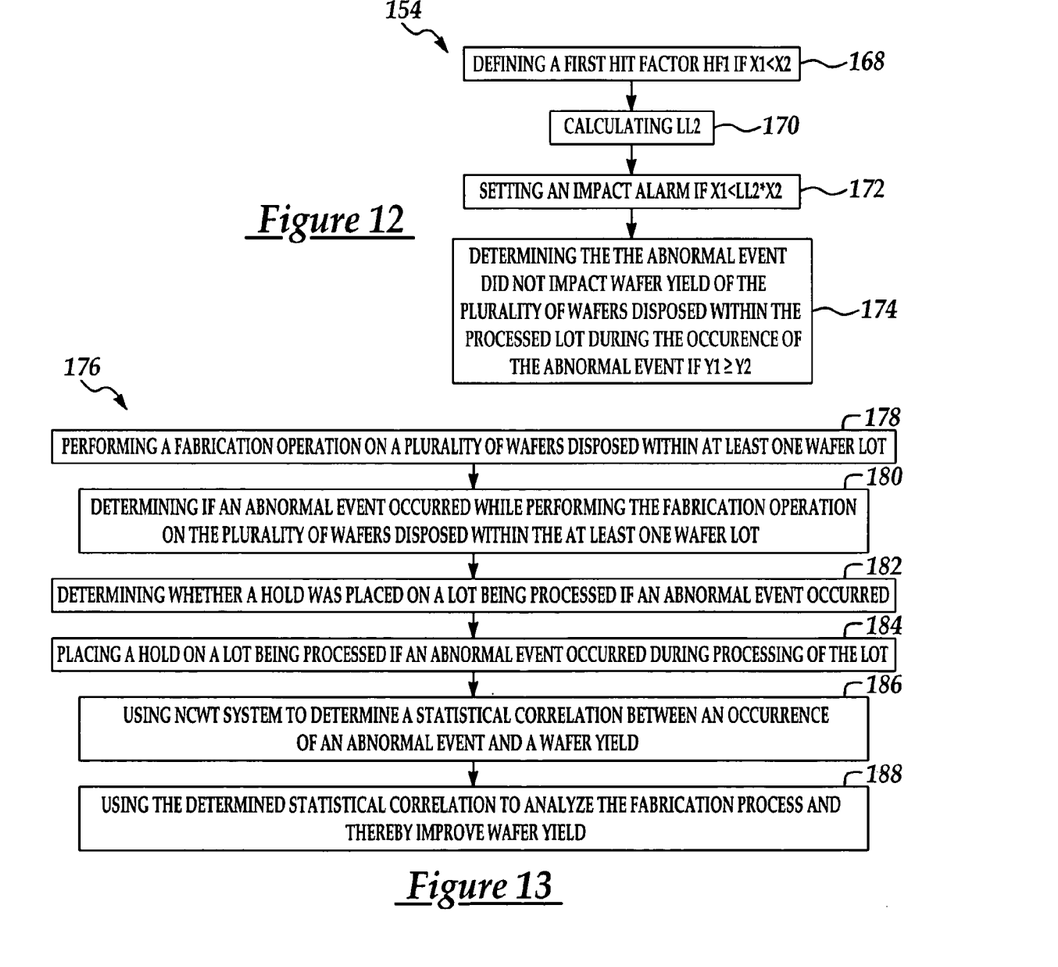
FIG. 12 is a flowchart illustrating a method of comparing a third mean Y1 of the total lot wafers evaluated in accordance with pre-defined criteria with a fourth mean Y2 of a total number of wafers processed within a predefined time period prior to the occurrence of an abnormal event to determine if the abnormal event impacted a wafer yield of a lot in accordance with a preferred embodiment of the present invention.
FIG. 13 is a flowchart illustrating a method of improving wafer yield of wafers processed within a wafer fabrication facility.

In accordance with a preferred embodiment, as shown in FIG. 12, the step of comparing a third mean Y1 of the total lot of the plurality of wafers evaluated in accordance with the WAT pre-defined criteria with a fourth mean Y2 of a total number of wafers processed within a predefined time period prior to the occurrence of the abnormal event evaluated in accordance the pre-defined wafer control criteria to determine if the abnormal event impacted a wafer yield of the lot (step 154) further has the step of:

defining a second hit factor HF2 if $Y1<Y2$ (step 168);

calculating a second predefined tolerance level limit LL2 used to identify a statistical difference between the plurality of wafers disposed within the processed lot during the occurrence of the abnormal event and the total number of wafers processed within a predefined time period (step 170), wherein $LL2=HF2*Y2$;

setting an impact alarm if $Y1<LL2*Y2$ (step 172), wherein if an impact alarm is set, then the abnormal event impacted the wafer yield of the plurality of wafers disposed within the processed lot during the occurrence of the abnormal event; and determining that the abnormal event did not impact a wafer yield of the plurality of wafers disposed within the processed lot during the occurrence of the abnormal event if Y1 Y2 (step 174).

In accordance with another preferred embodiment, as shown in FIG. 13, a method 176 of improving wafer yield of wafers processed within a wafer fabrication facility generally having the steps of:

performing a fabrication operation on a plurality of wafers disposed within at least one wafer lot (step 178);

determining if an abnormal event occurred while performing the fabrication operation on the plurality of wafers disposed within the at least one wafer lot (step 180);

determining whether a hold was placed on a lot being processed if an abnormal event occurred (step 182);

placing a hold on a lot being processed if an abnormal event occurred during processing of the lot (step 184);

using a NCWT system to determine a statistical correlation between an occurrence of an abnormal event and a wafer yield of the plurality of wafers being processed during the occurrence of the abnormal event if the abnormal event occurred during processing of the plurality of wafers disposed within the at least one wafer lot (step 186); and using the determined statistical correlation to analyze the fabrication process and thereby improve wafer yield (step 188).

From the foregoing, it should be appreciated that the present invention provides an Intelligent Engineering Data Analysis (I-EDA) system and method to help prevent low wafer yield and prevent occurrences of abnormal events.

While a preferred exemplary embodiment has been presented in the foregoing detailed description, it should be understood that a vast number of variations exist and this preferred exemplary embodiment is merely an example, and it is not intended to limit the scope, applicability or configuration of the invention in any way. Rather, the foregoing detailed description provides those of ordinary skill in the art with a convenient guide for implementing a preferred embodiment of the invention and various changes can be made in the function and arrangements of the exemplary embodiment without departing from the spirit and scope of the appended claims.

What is claimed is:

1. A method of improving wafer yield of wafers processed within a wafer fabrication facility comprising the steps of:

performing a fabrication operation on a plurality of wafers disposed within at least one wafer lot;

determining if an abnormal event occurred while performing the fabrication operation on the plurality of wafers disposed within the at least one wafer lot;

using a nonconforming wafer tracing system to determine a statistical correlation between an occurrence of an abnormal event and a wafer yield of the plurality of wafers being processed during the occurrence of the abnormal event if the abnormal event occurred during processing of the plurality of wafers disposed within the at least one wafer lot by using a statistical test method to test non-conforming event and calculate a hit rate (HR), wherein the HR ranges between 0 and 1 such that $0 \leq HR \leq 1$ to indicate a probability that the abnormal event impacted wafer yield of the plurality of wafers disposed within the at least one wafer lot, wherein if the HR equals zero, then the probability that the abnormal event impacted wafer yield is low, and wherein if the HR equals 1, then the probability that the abnormal event impacted wafer yield is high; and using the determined statistical correlation to analyze the fabrication process and thereby improve wafer yield.

2. The method of claim 1, wherein the step of calculating a hit rate further comprises the step of:
   summing a total number of occurrences that an abnormal event set an impact alarm ($\Sigma TIA$) within a predefined time period P;
   summing a total number of occurrences of an abnormal event ($\Sigma TAE$) within 2; and
   determining the hit rate by dividing $\Sigma TIA$ by $\Sigma TAE$, wherein the hit rate $=\Sigma TIA/\Sigma TAE$.

3. The method of claim 1, wherein the step of generating a hit rate report using the calculated hit rate,
   using the determined statistical correlation to analyze the fabrication process and thereby improve wafer yield.

4. The method of claim 1, wherein the step of using a nonconforming wafer tracing system to determine a statistical correlation between an occurrence of an abnormal event and a wafer yield of the plurality of wafers being processed during the occurrence of the abnormal event if the abnormal event occurred during processing of the plurality of wafers disposed within the at least one wafer lot further comprises the steps of:
   evaluating each of the plurality of wafers to determine if each of the plurality of wafers meets a wafer acceptance test using pre-defined wafer control criteria;
   comparing a first mean X1 of each of the plurality of wafers not meeting the wafer acceptance test with a second mean X2 of each of the plurality of wafers meeting the wafer acceptance test to determine if the abnormal event impacted a wafer yield of the lot;
   comparing a third mean Y1 of the total lot of the plurality of wafers evaluated in accordance with the WAT pre-defined criteria with a fourth mean Y2 of a total number of wafers processed within a predefined time period prior to the occurrence of the abnormal event evaluated in accordance the pre-defined wafer control criteria to determine if the abnormal event impacted a wafer yield of the lot; and
   setting an impact alarm if the abnormal event impacted the wafer yield of the lot.

5. The method of claim 4, wherein the step of comparing X1 with X2 to determine if the abnormal event impacted a wafer yield of the lot further comprises the steps of:
   defining a hit factor HF if X1<X2;
   calculating a predefined tolerance level limit LL used to identify a statistical difference between the wafers not passing the WAT and the wafers passing the WAT, wherein LL=HF *X2; and
   setting an impact alarm if X1<LL*X2, wherein if an impact alarm is set, then the abnormal event impacted the wafer yield of the plurality of wafers disposed within the processed lot during the occurrence of the abnormal event.

6. The method of claim 4, further comprising the step of:
   determining that the abnormal event did not impact wafer yield of the plurality of wafers disposed within the processed lot during the occurrence of the abnormal event if X1$\geq$X2.

7. The method of claim 4, further comprising the step of:
   defining a hit factor HF if Y1<Y2;
   calculating a predefined tolerance level limit LL used to identify a statistical difference between the plurality of wafers disposed within the processed lot during the occurrence of the abnormal event and the total number of wafers processed within a predefined time period, wherein LL=HF *Y2; and
   setting an impact alarm if Y1<LL*Y2, wherein if an impact alarm is set, then the abnormal event impacted the wafer yield of the plurality of wafers disposed within the processed lot during the occurrence of the abnormal event.

8. The method of claim 4, further comprising the step of:
   determining that the abnormal event did not impact a wafer yield of the plurality of wafers disposed within the processed lot during the occurrence of the abnormal event if Y1$\geq$Y2.

9. The method of claim 4, wherein the step of evaluating each of the plurality of wafers to determine if each of the plurality of wafers meets a wafer acceptance test using pre-defined wafer control criteria further comprises:
   using a circuit probe to perform the wafer acceptance test.

10. A method of improving wafer yield of wafers processed within a wafer fabrication facility having the steps of:
    performing a fabrication operation on a plurality of wafers disposed within at least one wafer lot;
    determining if an abnormal event occurred while performing the fabrication operation on the plurality of wafers disposed within the at least one wafer lot by collecting a plurality of non-conforming wafer-based data associated with the plurality of wafers disposed within the wafer lot;
    storing the plurality of non-conforming wafer-based data associated with the plurality of wafers disposed within the wafer lot in a non-conforming wafer based data database;
    defining a plurality of abnormal event types within an abnormal event database; and
    associating at least one of the plurality of abnormal event types with at least one of the stored plurality of non-conforming water-based data stored within the non-conforming wafer based data database when an abnormal event occurs during a processing operation;
    determining whether a hold was placed on a lot being processed if an abnormal event occurred;
    placing a hold on a lot being processed if an abnormal event occurred during processing of the lot;
    using a nonconforming wafer tracing system to determine a statistical correlation between an occurrence of an abnormal event and a wafer yield of the plurality of wafers being processed during the occurrence of the abnormal event if the abnormal event occurred during processing of the plurality of wafers disposed within the at least one wafer lot; and
    using the determined statistical correlation to analyze the fabrication process and thereby improve wafer yield.

11. A method of using an intelligent engineering data analysis having a non-conforming wafer tracing system to improve a fabrication process comprising the steps of:
    defining a plurality of non-conforming event types to be recorded into a nonconforming wafer tracing system, wherein the nonconforming wafer tracing system has a nonconforming wafer test graphical user interface for inputting a plurality of nonconforming wafer test data;
    using a standard format to collect abnormal event data and non-conforming wafer based data disposed within a manufacturing execution system;
    extracting the collected abnormal event data and the non-conforming wafer based data from an manufacturing execution system into the nonconforming wafer tracing system;
    transforming the extracted abnormal event data and non-conforming wafer based data into a plurality of non-conforming wafer test data, wherein the plurality of nonconforming wafer test data is disposed within the nonconforming wafer tracing system;

correlating the plurality of nonconforming wafer test data with results of a wafer acceptance test;

using the nonconforming wafer test graphical user interface to input a plurality of nonconforming wafer test data associated with each lot processed during an occurrence of an abnormal event;

using the nonconforming wafer test graphical user interface to generate a daily lot report, wherein the daily lot report identifies each lot associated with an abnormal event as a potential lot that may have a low wafer yield;

sending the daily lot report to recipients who are pre-defined to receive the daily lot report from the nonconforming wafer test graphical user interface; and providing a flexible analysis function within the nonconforming wafer test graphical user interface to generate at least one engineering data analysis report for analyzing abnormal events that impacted low wafer yield.

12. The method of claim 11, wherein the step of providing a flexible analysis function within the nonconforming wafer test graphical user interface to generate at least one engineering data analysis report for analyzing abnormal events that impacted low wafer yield comprises the step of:

generating at least one data analysis report, wherein the at least one engineering data analysis report is selected from at least one of an event count report, a hit rate report, an event count versus a tool events report, and a hit rate versus a tool events report.

13. The method of claim 12, further comprising the step of:

using the at least one data analysis report to modify at least one correction procedure selected from at least one of a recovery and a rework procedure.

* * * * *